(12) United States Patent
Greenfeld

(10) Patent No.: US 8,035,996 B1
(45) Date of Patent: Oct. 11, 2011

(54) ASYMMETRIC ZERO-VOLTAGE SWITCHING FULL-BRIDGE POWER CONVERTERS

(75) Inventor: Fred Greenfeld, Nederland, CO (US)

(73) Assignee: Intersil Americas Inc., Milpitas, CA (US)

( * ) Notice: Subject to any disclaimer, the term of this patent is extended or adjusted under 35 U.S.C. 154(b) by 100 days.

(21) Appl. No.: 12/651,433

(22) Filed: Dec. 31, 2009

Related U.S. Application Data

(60) Provisional application No. 61/170,076, filed on Apr. 16, 2009.

(51) Int. Cl.
*H02M 3/335* (2006.01)
(52) U.S. Cl. .......................................... 363/17; 363/132
(58) Field of Classification Search ................ 363/17, 363/56.05, 132
See application file for complete search history.

(56) References Cited

U.S. PATENT DOCUMENTS

| | | | |
|---|---|---|---|
| 4,860,189 A | | 8/1989 | Hitchcock |
| 4,866,592 A | * | 9/1989 | Fujii et al. ................. 363/98 |
| 5,132,888 A | | 7/1992 | Lo et al. |
| 5,157,592 A | | 10/1992 | Walters |
| 5,198,969 A | | 3/1993 | Redl et al. |
| 5,418,703 A | | 5/1995 | Hitchcock et al. |
| 6,016,258 A | | 1/2000 | Jain et al. |
| 6,483,724 B1 | | 11/2002 | Blair et al. |
| 6,650,558 B1 | | 11/2003 | Pacala et al. |
| 7,136,294 B2 | | 11/2006 | Phadke et al. |
| 2005/0030767 A1 | | 2/2005 | Phadke et al. |
| 2007/0014130 A1 | | 1/2007 | Chiou |

* cited by examiner

*Primary Examiner* — Shawn Riley
(74) *Attorney, Agent, or Firm* — Fogg & Powers LLC

(57) ABSTRACT

Disclosed are full-bridge power converters providing DC output power at increased conversion efficiencies, and methods of operating full-bridge power converters providing DC output power at increased conversion efficiencies. In disclosed embodiments, the switches of the full-bridge are operated to reduce conduction losses and to provide for zero-voltage switching.

22 Claims, 4 Drawing Sheets

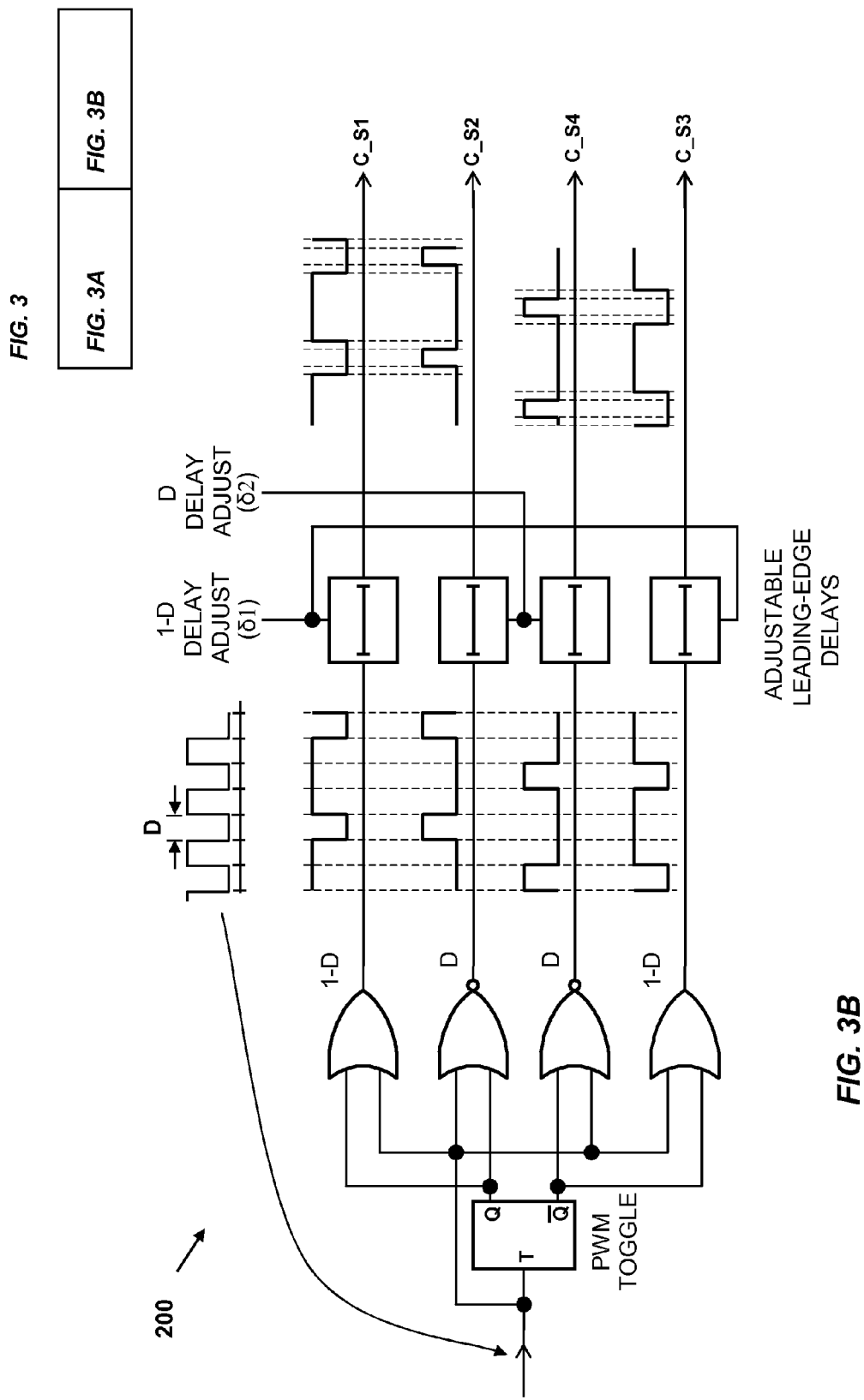

ASYMMETRIC ZERO-VOLTAGE SWITCHING FULL-BRIDGE POWER CONVERTERS

CROSS-REFERENCES TO RELATED APPLICATIONS

This application claims priority from U.S. Provisional Patent Application No. 61/170,076 entitled "Asymmetric Zero-Voltage Switching Full-Bridge Power Converters," filed Apr. 16, 2009, the contents of which are hereby incorporated in their entirety by reference for all purposes.

BACKGROUND OF THE INVENTION

Many DC to DC power converter topologies, such as forward, flyback, SEPIC, full-bridge, etc., are known to the art. Such converters have power conversion efficiencies that are typically in the range of 70% to 95%. One cause of low power conversion efficiency is the energy wasted in switching the converter's power transistors. To reduce wasted energy, many power converter designs attempt to switch their power transistors to on-states when the voltages across the switches are near zero volts, which is often referred to as "zero-voltage switching". However, true zero-voltage switching designs for full-bridge converter topologies have been difficult to achieve. The basic full-bridge converter simply dumps the transformer's energy into both midpoints of the switching waveform of the primary winding without selective steering. As a result, the basic full-bridge converter is much more prone to "hard switching," which means that a given power transistor is turned on with a significant voltage across its conduction terminals (e.g., drain and source terminals), leading to large power dissipations.

BRIEF SUMMARY OF THE INVENTION

As part of making his invention, the inventor has developed more effective switching sequences for the bridge switches to better effect zero-voltage switching. The switching sequences can also be adapted to reduce conduction losses in the body diodes of some of the switches, particularly at low duty-cycle values.

A first exemplary embodiment of the invention is directed to a full-bridge power converter providing DC output power. The exemplary power converter comprises an input port to receive a source of power to be converted, an output port to provide DC output power, a bridge circuit, and a transformer. The bridge circuit comprises a first switch and a second switch coupled in series at a first node, and a third switch and a fourth switch coupled in series at a second node. The series combination of the first and second switches is coupled in parallel with the input port, and the series combination of the third and fourth switches is coupled in parallel with the input port. The transformer comprises a primary winding coupled to the first and second nodes, and at least one secondary winding. The exemplary power converter further comprises a current rectifying circuit coupled to the at least one secondary winding of the transformer, and an output inductor coupled between the rectifying circuit and the output port. Each of the first through fourth switches is switched between alternating conducting and non-conducting states a plurality of times, wherein the first and second switches are switched so that they are not in conducting states at the same time, wherein the third and fourth switches are switched so that they are not in conducting states at the same time, wherein the second and fourth switches are switched so that they are not in conducting states at the same time, and wherein the first and third switches are switched so they are in conducting states at the same time during a plurality of time durations.

A second exemplary embodiment of the invention is directed to a full-bridge power converter providing DC output power. The exemplary power converter comprises an input port to receive a source of power to be converted, an output port to provide DC output power, a bridge circuit, and a transformer. The bridge circuit comprises a first transistor, a second transistor, a third transistor, and a fourth transistor. Each transistor has a first conduction terminal, a second conduction terminal, and a modulation terminal. The modulation terminal receives a control signal having a first state that places the transistor in a conducting state where current can be conducted from its first conduction terminal to its second conduction terminal and a second state that places the transistor in a non-conducting state where current cannot be conducted from its first conduction terminal to its second conduction terminal. Each of the first and second transistors has one of its conduction terminals coupled to a first node and the other of its conduction terminals coupled to a respective terminal of the input port. Each of the third and fourth transistors has one of its conduction terminals coupled to a second node and the other of its conduction terminals coupled to a respective terminal of the input port. The transformer comprises a primary winding coupled to the first and second nodes, and at least one secondary winding. The exemplary power converter further comprises a current rectifying circuit coupled to the at least one secondary winding of the transformer, and an output inductor coupled between the rectifying circuit and the output port. Each of the first through fourth transistors is switched between alternating conducting and non-conducting states a plurality of times, wherein the first and second transistors are switched so that they are not in conducting states at the same time, wherein the third and fourth transistors are switched so that they are not in conducting states at the same time, wherein the second and fourth transistors are switched so that they are not in conducting states at the same time, and wherein the first and third transistors are switched so they are in conducting states at the same time during a plurality of time durations.

A third exemplary embodiment of the invention is directed to a method of operating a full-bridge power converter providing DC output power. The power converter comprises an input port to receive a source of power to be converted, an output port to provide DC output power, a bridge circuit, and a transformer. The bridge circuit comprises a first switch and a second switch coupled in series at a first node, and a third switch and a fourth switch coupled in series at a second node. The series combination of the first and second switches is coupled in parallel with the input port, and the series combination of the third and fourth switches is coupled in parallel with the input port. The transformer comprises a primary winding coupled to the first and second nodes, and at least one secondary winding. The exemplary power converter further comprises a current rectifying circuit coupled to the at least one secondary winding of the transformer, and an output inductor coupled between the rectifying circuit and the output port. The exemplary method comprises: placing the first switch in a conducting state, thereafter placing the third switch in a non-conducting state, thereafter placing the fourth switch in a conducting state, thereafter placing the fourth switch in a non-conducting state, thereafter placing the third switch in a conducting state, thereafter placing the first switch in a non-conducting state, thereafter placing the second switch in a conducting state, and thereafter placing the second switch in a non-conducting state.

Further details regarding the embodiments of the invention are provided below in the Detailed Description section with Reference to the Figures

DETAILED DESCRIPTION OF THE INVENTION

Figure 1:
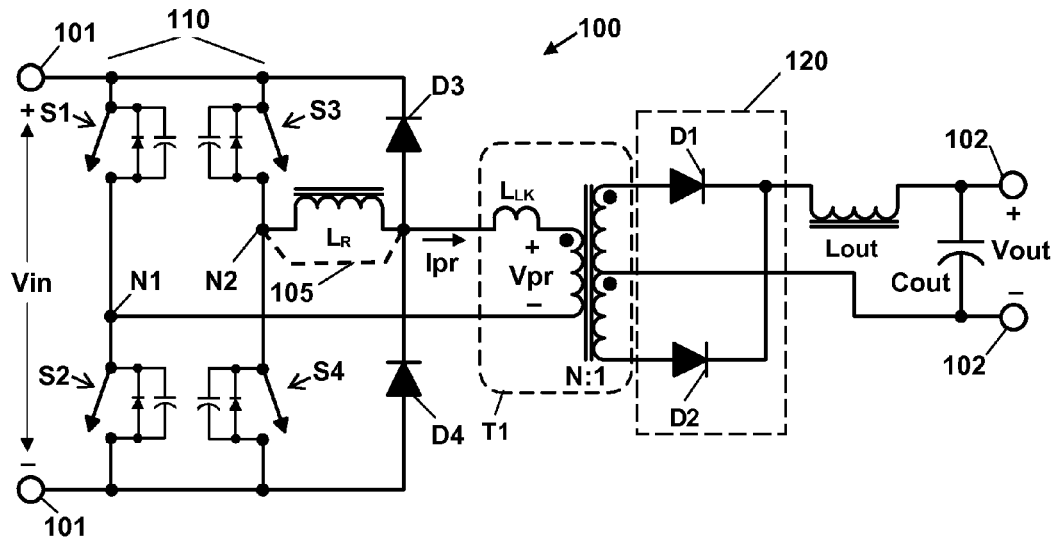
FIG. 1 shows a schematic diagram of an exemplary full-bridge DC-output converter according to an embodiment of the present invention.

The techniques in accordance with the present invention will be described more fully hereinafter with reference to the accompanying drawings, in which exemplary embodiments of the invention are shown. This invention may, however, be embodied in different forms and should not be construed as limited to the embodiments set forth herein. Rather, these embodiments are provided so that this disclosure is thorough and complete and fully conveys the scope of the invention to one skilled in the art. The same reference numerals are used to denote the same elements throughout the specification. The elements may have different interrelationships and different positions for different embodiments.

The terms used herein are for illustrative purposes of the present invention only and should not be construed to limit the meaning or the scope of the present invention. As used in this specification, a singular form may, unless definitely indicating a particular case in terms of the context, include a plural form. Also, the expressions "comprise" and/or "comprising" used in this specification neither define the mentioned shapes, numbers, steps, actions, operations, members, elements, and/or groups of these, nor exclude the presence or addition of one or more other different shapes, numbers, steps, operations, members, elements, and/or groups of these, or addition of these. Terms such as "first," "second," etc. are used to describe various components. However, it is obvious that the components should not be defined by these terms. The terms are used only for distinguishing one component from another component. Thus, a first component which will be described may also refer to a second component without departing from the scope of the present invention. Spatially relative terms, such as "top," "bottom," "upper," "left," "right," "above," "below," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures.

It will also be understood that when an element, such as an electrical component, is described as being "coupled to," or "electrically coupled to" another element, it may be directly coupled to the other element, or one or more intervening elements may be present in the coupling. In contrast, when an element is referred to as being "directly coupled to" another element or layer, there are no intervening elements present. It may be appreciated that the claims of the application may be amended to recite exemplary relationships described in the specification or shown in the figures with the support thereof being provided by the original application. The term "and/or" used herein includes any and all combinations of one or more of the associated listed items.

FIG. 1 shows a schematic diagram of an exemplary full-bridge DC-output converter 100 according to an embodiment of the present invention. Converter 100 comprises an input port 101 to receive a source of power (at a voltage Vin) to be converted, an output port 102 to provide a DC output power at a voltage Vout, a bridge circuit 110 that applies the input power to a transformer T1, a rectifying circuit 120 coupled to the secondary side of transformer T1, an output inductor Lout coupled between the rectifying circuit 120 and the output port 102, and an output capacitor Cout coupled in parallel with output port 102. Transformer T1 has a primary winding, a first secondary winding (top secondary winding), second secondary winding (bottom secondary winding), and a parasitic leakage inductance $L_{LK}$ that naturally results from the winding construction of the transformer. Rectifying circuit 120 has a first diode D1 coupled between the top secondary winding and output inductor Lout, and a second diode D2 coupled between the bottom secondary winding and output inductor Lout. A large dot notation has been given at one terminal of each transformer winding to show the orientation of the winding relative to other windings. A voltage designation may be assigned to each winding, such as Vpr for the primary winding. Without loss of generality, the positive side of the winding's voltage designation will be assigned to the terminal with the large dot. When a voltage is applied to the transformer's primary winding, a voltage is generated at each of the secondary windings in relation to the turns ratio 1:N of the transformer. In the schematic diagrams shown herein, wires that cross one another do not make electrical contact to one another unless there is a small dot shown at their crossing.

Bridge circuit 110 comprises a first switch S1 and second switch S2 coupled in series at a first node N1, and a third switch S3 and fourth switch S4 coupled in series at a second node N2. Each switch S1-S4 comprises a semiconductor switching device (such as a MOSFET, BJT, IGBT, etc.), which has a parasitic capacitance disposed in parallel with the switch's conduction terminals (e.g., source and drain for MOSFET, emitter and collector for BJT and IGBT) and may have a parasitic conduction diode similarly disposed. If the parasitic conduction diode is not present in the semiconductor device for the switch, a diode or rectifier may be coupled in parallel with the conduction terminals of the semiconductor device. Each semiconductor device also has a modulation terminal (e.g., gate, base, etc.), to which a control signal is applied to control the flow of current between the device's conduction terminals. The modulation terminals are schematically shown in FIG. 1 by the arrow symbols next to the switches. The series combination of switches S1 and S2 are coupled in parallel with input port 101, and the series combination of switches S3 and S4 are coupled in parallel with the input port 101. Each of nodes N1 and N2 is electrically coupled to a terminal of the primary winding of transformer T1. As described below in greater detail, one of the nodes, such as node N2, may be coupled to the primary winding by way of a resonant inductor $L_R$ to increase the range of zero-voltage switching for converter 100. If resonant inductor $L_R$ is used, diodes D3 and D4 may be added to limit the positive and negative voltage excursions at the inductor's terminal that is coupled to transformer T1 (the anode of D3 is coupled to $L_R$, the cathode of D3 is coupled to the positive side of input port 101, the anode of D4 is coupled to the negative side of input port 101, and the cathode of D4 is coupled to $L_R$). If resonant inductor $L_R$ is not used, a direct connection 105 (shown by a dashed line) may be used.

Resonant inductor $L_R$ may be coupled to either of nodes N1 or N2; FIG. 1 illustrates the inductor as being coupled to node N2. Equivalently, the position of the combination of switches S1 and S2 may be swapped with the position of the combination of switches S3 and S4. Accordingly, it should be understood that the recitations of first switch, second switch, third switch, fourth switch, first transistor, second transistor, third transistor, and fourth transistor in the claims and in the Brief Summary of the Invention section encompass each of these configurations. That is, the switching operations of (e.g., control signals for) the first switch and first transistor recited in the claims and in the Brief Summary can be applied to switch S1 or switch S3, the switching operations of (e.g., control signals for) the second switch and second transistor recited in the claims and in the Brief Summary can be applied to switch S2 or switch S4, the switching operations of (e.g., control signals for) the third switch and third transistor recited in the claims and in the Brief Summary can be applied to switch S3 or switch S1, and the switching operations of (e.g., control signals for) the fourth switch and fourth transistor recited in the claims and in the Brief Summary can be applied to switch S4 or switch S2.

When in a conducting state, the semiconductor device of a switch S1-S4 may have a voltage drop of 0.15 V or less across its conduction terminals. This voltage is translated to the conduction terminals of the switch. The parasitic conduction diode of a switch S1-S4, if present, has a voltage drop of about 0.6 V to 0.8 V when conducting; and a rectifier added to a switch S1-S4 may have a voltage drop as low as about 0.3 V when conducting. When the semiconductor device of a switch is conducting, the parasitic diode or added rectifier is not conducting, or only conducting an insignificant amount of the current flowing through the switch (e.g., less than 1%). Typically, the semiconductor device of a switch is intended to control the flow of current in a particular direction for the switch (such as in the direction that provides power to transformer T1). The parasitic diode, or added rectifier, is oriented to conduct in the opposite direction so as to allow current flow when forward biased and to limit the voltage across the semiconductor device when the semiconductor device is not conducting, and thus to act as a safety mechanism. When placed in a conducting state by the control signal at its modulation terminal, the current flow through the semiconductor device can typically flow in either direction (bi-directional conducting). In contrast, each of the parasitic diode and added rectifier only conducts in one direction (uni-directional conducting). To simplify the description herein, when a switch S1-S4 is referred to as being closed, conducting, or in a conducting state, it means that the switch's semiconductor device is in a conducting state; and when a switch S1-S4 is referred to as being opened, non-conducting, or in a non-conducting state, it means that the switch's semiconductor device is in a non-conducting state and that the parasitic diode (if present) or added diode/rectifier (if present) may conduct current if the voltage present across the switch's conduction terminals permits such conduction.

Switches S2 and S3 may be closed (placed in conducting states) at the same time to cause power and a positive voltage to be applied to the primary winding of transformer T1 and to cause current to flow into the dotted terminal of the primary winding (a positive value of Ipr). This causes current to flow out of the dotted terminal of the transformer's top secondary winding and through diode D1 to output inductor Lout. The current is sent to output capacitor Cout and the load at output port 102, and returns back to the non-dotted terminal of the top secondary winding. On the other hand, switches S1 and S4 may be closed (placed in conducting states) at the same time to apply a negative voltage to the primary winding and to cause current to flow out of the dotted terminal of the primary winding (a negative value of Ipr). This causes current to flow out of the non-dotted terminal of the transformer's bottom secondary winding and through diode D2 to output inductor Lout. The current is sent to output capacitor Cout and the load at output port 102, and returns back to the dotted terminal of the bottom secondary winding. Thus, the application of either positive voltage or negative voltage to the transformer's primary provides power to output port 102.

The voltage at output port 102 can be regulated by controlling the amount of power provided by output inductor Lout, which in turn can be controlled by controlling the time duration that the switch pairs (S2/S3, and S1/S4) are conducting. When power is not being provided to inductor Lout, both of switches S1 and S3 are placed in conducting states to provide a voltage near zero volts across the transformer windings so that inductor Lout may have a free-wheeling current path through one or both of diodes D1 and D2. This near zero-voltage condition may also be provided by placing both of switches S2 and S4 in conducting states. The free-wheeling current of inductor Lout is reflected back to the primary winding, and keeps current flowing and energy stored in the transformer's leakage inductance $L_{LK}$, and also in resonant inductor $L_R$, if present. Each switch of the pair of switches used to provide the zero volts across the primary winding for free wheeling (i.e., either S1 and S3, or S2 and S4) permits current to flow in either direction through its conduction terminals when the switch is placed in a conducting state. This is distinguishable from the body diode associated with the switch, which only permits current flow in one direction through its conduction terminals. Thus, the conducting states for these transistors are bidirectional conducting states.

Figure 2:
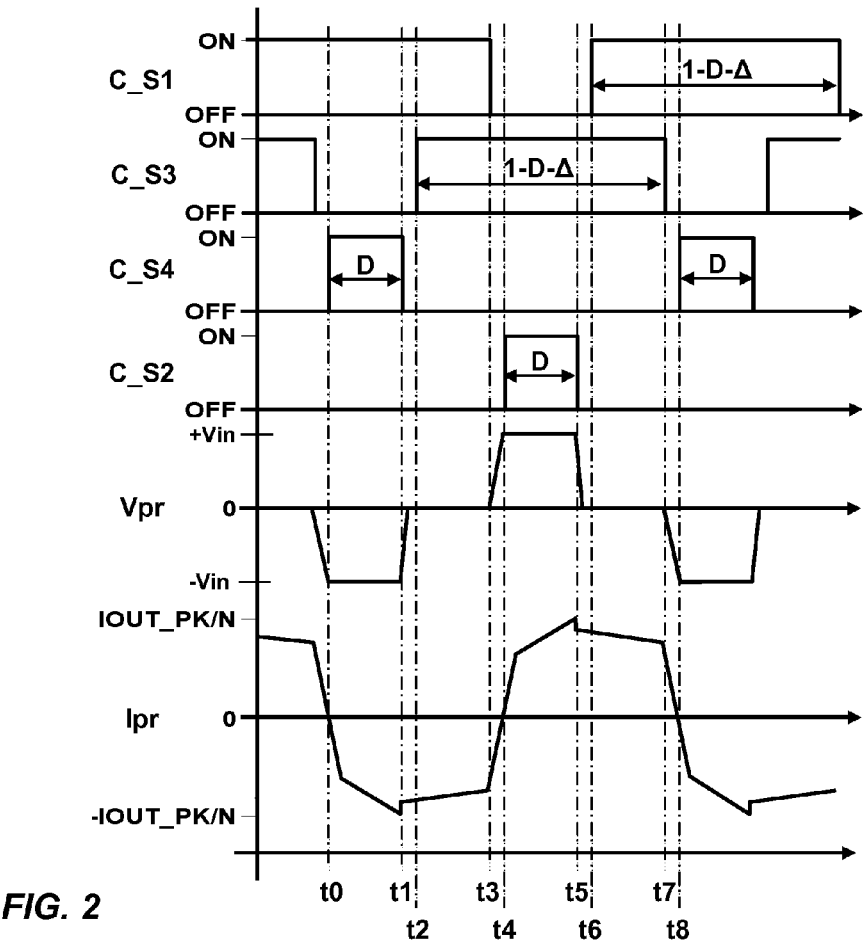
FIG. 2 shows an exemplary timing diagram for the switch control signals and the primary voltage and current for the transformer of the converter shown in FIG. 1 according to an embodiment of the present invention.

An exemplary switching sequence is provided next with reference to the timing diagram shown in FIG. 2, which shows a timing diagram of the control signals to the modulation terminals of switches S1-S4, the voltage Vpr across the transformer's primary winding, and the current Ipr flowing through the transformer's primary winding. Eight time points t0-t8 are shown in the timing diagram. One full switching cycle occurs between time points t0 and t8. Just prior to time point to, the control signal to switch S1 is in an ON state while the control signals to switches S2-S4 are in OFF states. At time point t0, switch S4 is turned on, and both of switches S1 and S4 cause power and a voltage of negative polarity to be applied to the primary winding by way of $L_{LK}$ and $L_R$ (if present), which causes power to be transferred to inductor Lout via diode D2. During this time, energy is stored in inductance $L_{LK}$ and inductor $L_R$ (if present).

Switch S4 may then be turned off at time point t1, and then a short time duration later, switch S3 may be turned on at time point t2. During this short duration, the current Iout through inductor Lout flows through the bottom secondary winding and is reflected to the primary winding as a current that flows from switch S1 into the capacitances coupled to node N2, thereby raising the voltage of node N2 up from zero toward the input voltage level since switch S4 is off. As such, switch S3 may be turned on under zero-voltage conditions (i.e., zero voltage switching) or near thereto. The energy in inductance $L_{LK}$ and inductor $L_R$ (if present) assists in this transition. This voltage transition is relatively fast and energetic due to the presence of the reflected current Iout from inductor Lout.

With switches S1 and S3 in conducting states between time points t2 and t3, inductor Lout is allowed to free-wheel to achieve a desired control of the output voltage Vout. The current for inductor Lout flows through both of the secondary windings, but principally in diode D2 due to transformer action. The energy in each of inductance $L_{LK}$, inductor $L_R$ (if present), and output inductor Lout decreases during this time duration. Prior art full-bridge converters would not have switch S3 in a conducting state (ON state) at this time period, and instead would rely upon the parasitic diode of switch S3 to carry the current flow. However, as part of making his invention, the inventor has recognized that such a configuration leads to conduction losses in the body diode, which can be significant for light duty cycle conditions. It also leads to a faster dissipation of energy in each of inductance $L_{LK}$, inductor $L_R$ (if present), and output inductor Lout, which lessens the possibility of achieving zero voltage switching in the next time segment between time points t3 and t4. Taking the case of a reflected free-wheeling current of 5 A, a forward voltage drop of 0.7 V for the body diode of switch S3, and an ON-resistance of 70 mΩ for each of switches S1 and S3, the power dissipated in switches S1 and S3 during this time segment is approximately 3.5 watts, whereas a prior art full-bridge converter would dissipate approximately 5.25 watts. According, the invention reduces these conduction losses by approximately 33% during this time segment.

Next, switch S1 may then be turned off at time point t3, and then a short time duration later, switch S2 may be turned on at time point t4. During this second short duration, the current supported by the energy stored in the transformer's leakage inductance $L_{LK}$, and optionally in resonant inductor $L_R$, now flows out of the capacitances coupled to node N1 and into switch S3 (which is still on), thereby lowering the voltage of node N1 from the input voltage level to near zero volts (since switch S1 is off). As such, switch S2 may be turned on under zero-voltage conditions (i.e., zero voltage switching) or near thereto at time point t4. In contrast to the previous voltage transition between time points t1 and t2, relatively little or none of the current of inductor Lout is reflected to the primary winding during this transition, and this voltage transition is not as fast or as energetic as the previous voltage transition. This voltage transition is mainly based on the resonant transfer of energy from the leakage inductance $L_{LK}$ and resonant inductor $L_R$ (if present) to the capacitances coupled to node N1.

Between time points t4 and t5, with both of switches S2 and S3 turned on, voltage of a positive polarity and power are applied to the primary winding by way of $L_{LK}$ and $L_R$ (if present), and power is transferred to inductor Lout via diode D1. During this time, energy is stored in inductance $L_{LK}$ and inductor $L_R$ (if present).

Switch S2 may then be turned off at time point t5, and then, a short time duration later, switch S1 may be turned on at time point t6. During this short duration, the current Iout through inductor Lout flows through the top secondary winding and is reflected to the primary winding as a current that flows from switch S3 into the capacitances coupled to node N1, thereby raising the voltage of node N1 up from zero toward the input voltage level since switch S2 is off. As such, switch S1 may be turned on under zero-voltage conditions (i.e., zero voltage switching) or near thereto. The energy in inductance $L_{LK}$ and inductor $L_R$ (if present) assists in this transition. This voltage transition is relatively fast and energetic due to the presence of the reflected current from inductor Lout.

With switches S1 and S3 in conducting states between time points t6 and t7, inductor Lout is allowed to free-wheel to achieve a desired control of the output voltage Vout. The current for inductor Lout flows through both of the secondary windings, but principally through diode D1 due to transformer action. The energy in each of inductance $L_{LK}$, inductor $L_R$ (if present), and output inductor Lout decreases during this time duration. Prior art full-bridge converters would not have switch S1 in a conducting state (ON state) at this time period, and instead would rely upon the parasitic diode of switch S1 to carry the current flow. However, as part of making his invention, the inventor has recognized that such a configuration leads to conduction losses in the body diode, which can be significant for light duty cycle conditions. It also leads to a faster dissipation of energy in each of inductance $L_{LK}$, inductor $L_R$ (if present), and output inductor Lout, which lessens the possibility of achieving zero voltage switching in the next time segment between time points t7 and t8. Taking the case of a reflected free-wheeling current of 5 A, a forward voltage drop of 0.7 V for the body diode of switch S1, and an ON-resistance of 70 mΩ for each of switches S1 and S3, the power dissipated in switches S1 and S3 during this time segment is approximately 3.5 watts, whereas a prior art full-bridge converter would dissipate approximately 5.25 watts. According, the invention reduces these conduction losses by approximately 33% during this time segment.

Next, switch S3 may then be turned off at time point t7, and then, a short time duration later, switch S4 may be turned on at time point t8. During this second short duration, the current supported by the energy stored in the transformer's leakage inductance $L_{LK}$, and optionally in resonant inductor $L_R$, now flows out of the capacitances coupled to node N2 and into switch S1 (which is still on), thereby lowering the voltage of node N2 from the input voltage level to near zero volts (since switch S3 is off). As such, switch S4 may be turned on under zero-voltage conditions (i.e., zero voltage switching) or near thereto at time point t8. In contrast to the previous voltage transition between time points t5 and t6, relatively little of the current of inductor Lout is reflected to the primary winding during this transition, and this voltage transition is not as fast or as energetic as the previous voltage transition. This voltage transition is mainly based on the resonant transfer of energy from the leakage inductance $L_{LK}$ and resonant inductor $L_R$ (if present) to the capacitances coupled to node N2. Time point t8 corresponds to time point t0 and completes the switching cycle.

In the above example, it may be appreciated that each side of bridge circuit 110 is operated as an asymmetric half-bridge topology, with one side comprising switches S1 and S2, and the other side comprising switches S3 and S4. In each half bridge, one switch (S2 or S4) is operated at a duty cycle D, which lies between 0 and 0.5 (50%), and the other switch (S1 or S3) is at a duty cycle of (1-D-Δ), where Δ is the dead time of two voltage transitions (e.g., t1-t2 and t7-t8). The value of (1-D-Δ) is always greater than 0.5 (50%), and may range up to 1.00 (100%). The operation of the switches in one half bridge is phase shifted by 180 degrees from the operation of the corresponding switching in the other half bridge. That is to say that the waveform of the control signal to switch S2 is phase shifted by 180 degrees from that of control signal to switch S4, or delayed by a time of 0.5*(t8-t0). Similarly, the waveform of the control signal to switch S1 is phase shifted by 180 degrees from that of control signal to switch S3, or delayed by a time of 0.5*(t8-t0). An exemplary circuit for generating the control signals for switches S1-S4 is provided below. It may be appreciated that one edge of a switch control signal may be set by a clock signal or the like, whereas another edge may be modulated according to D or (1-D-Δ), as the case may be. In a typical implementation, the leading edges of the control signals may be set of a clocking signal and the falling edges may be modulated by a modulation circuit to vary the duty cycle value D as needed to regulate the output voltage to a desired value.

It may also be appreciated that the above configuration enables the energy stored in the leakage inductance $L_{LK}$ of the transformer's primary winding and the resonant inductor $L_R$ (if present) of the primary to ring the "open" midpoint voltage of the primary winding up to positive input voltage (+Vin in FIG. 2) or ring down to the negative of the input voltage (−Vin), and to allow zero-voltage turn on of the bridge switches.

It may also be appreciated that switches S1 and S3 (the upper bridge switches) are turned on at the same time during much of the switching cycle, an amount that is on the order of (1-2D-2Δ). This time corresponds to time durations t2 to t3 and t6 to t7, which are times durations where the output inductor Lout is free wheeling. In comparison, the upper bridge switches of a prior art full-bridge DC-output converter are configured to be in non-overlapping conduction state and to be at a near 0.5 (50%) duty cycles. As such, a prior art full-bridge DC-output converter relies upon the body diodes of the upper bridge switches to conduct the reflected load current Iout and the current of the transformer leakage inductance. As part of making his invention, the inventor has recognized that the conduction of these currents through the body diodes generates a significant power loss, particularly at low values of duty cycle where the free-wheeling time durations occupy a significant amount of the switching cycle. These losses are significantly reduced by the above embodiment of the present invention with both of switches S1 and S3 being in conducting states during a significant portion (e.g., typically greater than 90%) of the free-wheeling durations of inductor Lout.

While this exemplary embodiment has been illustrated with the lower switches S2 and S4 having a duty cycle of D and the upper switches S1 and S3 having a duty cycle of (1-D-Δ), it may be appreciated that the reverse arrangement may be used (e.g., the lower switches S1 and S3 having a duty cycle of (1-D-Δ) and the upper switches S2 and S4 having a duty cycle of D. Accordingly, it should be understood that the recitations of the switching operations of the first switch, second switch, third switch, fourth switch, first transistor, second transistor, third transistor, and fourth transistor in the claims and in the Brief Summary of the Invention section encompass each of these configurations. That is, the switching operations of (e.g., control signals for) the first switch and first transistor recited in the claims and in the Brief Summary can be applied to switch S1 or switch S2, the switching operations of (e.g., control signals for) the second switch and second transistor recited in the claims and in the Brief Summary can be applied to switch S2 or switch S1, the switching operations of (e.g., control signals for) the third switch and third transistor recited in the claims and in the Brief Summary can be applied to switch S3 or switch S4, and the switching operations of (e.g., control signals for) the fourth switch and fourth transistor recited in the claims and in the Brief Summary can be applied to switch S4 or switch S3. In general, the switching operations (e.g., the control signals for) the switches S1-S4 of bridge circuit 100 may be interchanged top to bottom for both top-bottom pairs of switches (one pair being S1 and S2, and the other pair being S3 and S4), and left to right for both right-left pairs of switches (one pair being S1 and S3, and the other pair being S2 and S4). A combination of these interchanges is also possible (the combination being equivalent to a rotation of 180 degrees or a double diagonal interchange, S1 with S4 and S2 with S3). However, a single diagonal interchange of switching operations (e.g., control signals), such as those for S1 with those for S4 or those for S2 with those for S3, is not permitted.

In view of the above description, it may be appreciated that an exemplary method of operating converter 100 may comprise the following actions: placing switch S1 in a conducting state, thereafter placing switch S3 in a non-conducting state, thereafter placing switch S4 in a conducting state, thereafter placing switch S4 in a non-conducting state, thereafter placing switch S3 in a conducting state, thereafter placing switch S1 in a non-conducting state, thereafter placing switch S2 in a conducting state, and thereafter placing switch S2 in a non-conducting state.

Figures 3, 3A:
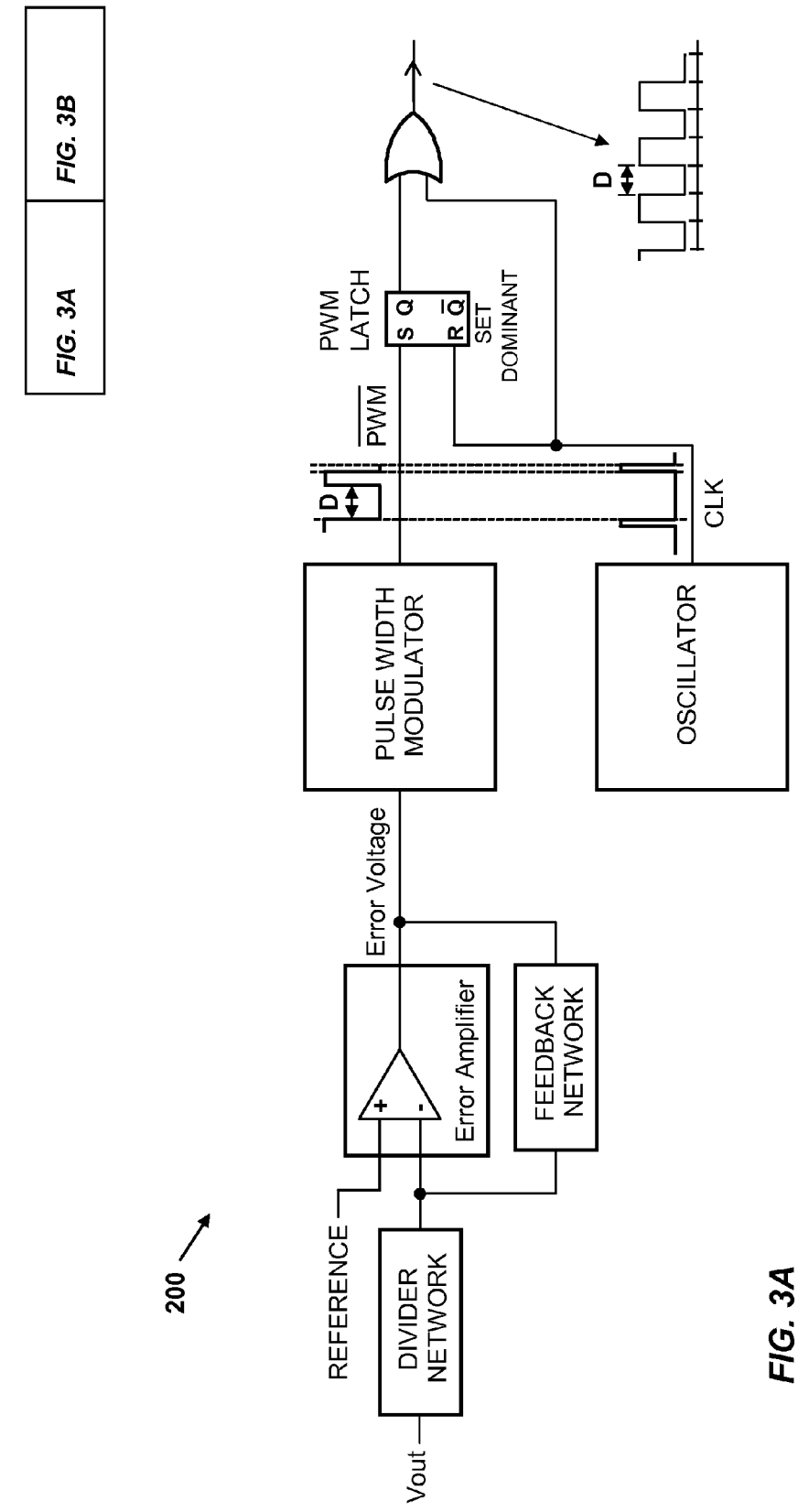
FIG. 3 shows an exemplary circuit that generates exemplary switch control signals for the converter shown in FIG. 1 according to an embodiment of the present invention.

FIG. 3 shows an exemplary circuit 200 that may be used to generate exemplary control signals for the switches S1-S4 of converter 100 described above. Circuit 200 comprises a divider network that samples the output voltage, a reference, and error amplifier that compares the sampled output voltage and the reference, and a feedback network that generates an error signal. The error signal provides a representation of what the switch duty cycle D should be in order to regulate the output voltage Vout to a desired value. Circuit 200 further comprises an oscillator, a pulse width modulator, a latch, and a logic gate (e.g., OR gate) that are configured to generate an output at the logic gate (right most signal in FIG. 3A) that comprises a series of pulses, each pulse having a width that varies in relation to the desired value of (1-D). The pulse width modulator can receive a trigger signal from the oscillator or the output the logic gate, where the trigger signal ends the prior modulation cycle and starts a new modulation cycle. In the example shown in FIG. 3, the pulse width modulator outputs the duty cycle signal in inverted form, with a low voltage for the duty cycle duration "D" during the initial portion of the modulation cycle, and a high voltage pulse for the duration of 1-D during the latter portion of the modulation cycle. (Subsequent circuitry, as described below, inverts the modulation signal before conveying to some of the switches.) However, the pulse width modulation provides its output modulation signal in non-inverted form. In either case, two modulation cycles (e.g., two high voltage pulses) are generated for each switching cycle of converter 100. It is within the ability of one of ordinary skill in the switching power supply art to arranged the aforementioned components to provide such a pulsed modulation signal, or to construct another arrangement of components to provide the pulsed signal. Referring to FIG. 3B, the pulsed modulation signal is provided a logic circuit (e.g., toggle flip-flop, 2 OR gates and 2 NOR gates) that generates two sets of initial control signals for the two half bridges. Each set of initial control signals has a signal with a pulse width of D and signal with a pulse width of (1-D). The two sets of initial control signals are phase shifted with respect to one another by 180 degrees (e.g., half of a switching cycle). The initial signals are then provided to respective delay elements that delay the leading edges of the signals by adjustable amounts, which generate the final control signals. The adjustable delay of the delay elements for the "D" signals may is denoted as δ1 in the figure, and the adjustable delay of the delay elements for the "1-D" signals may is denoted as δ2 in the figure. The sum of δ1 and δ2 is Δ (shown in FIG. 2). δ1 and δ2 can have the same or different values. The delay elements provide the previously described short durations t1-t2, t3-t4, t5-t6, and t7-t8 for zero-voltage switching. It is within the ability of one of ordinary skill in the switching power supply art to construct and arranged the aforementioned components to provide the initial and final control signals, or to construct another arrangement of components to provide these signals.

Figure 4:
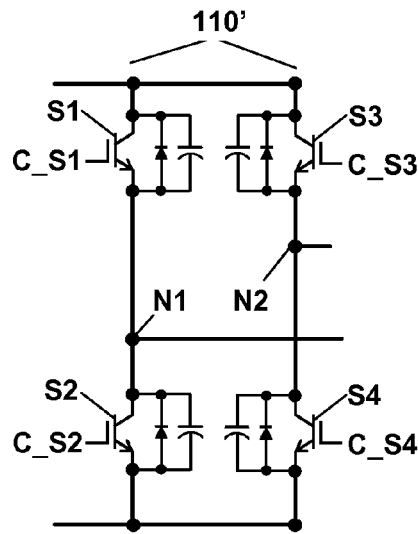
FIGS. 4 and 5 each show exemplary bridge circuits for the converter shown in FIG. 1 according to respective embodiments of the present invention.
Figure 5:
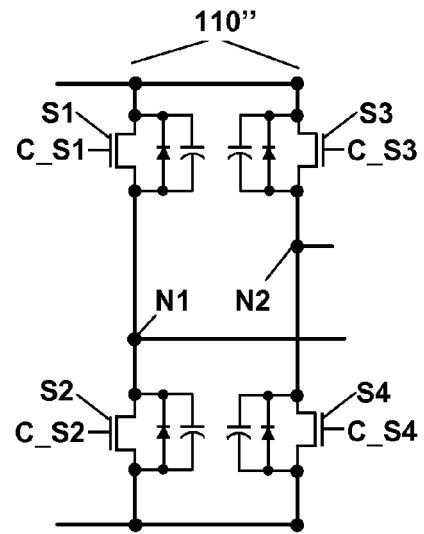
Figure 6:
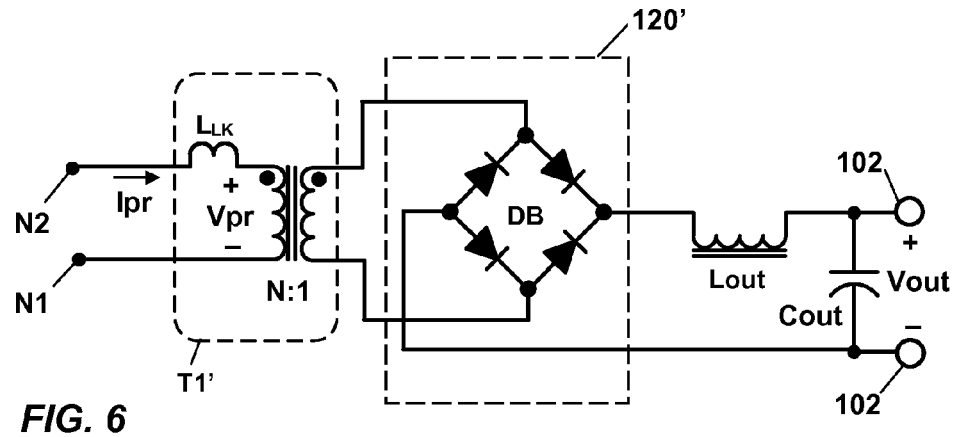
FIGS. 6 and 7 show additional exemplary implementations of the transformer and rectifying circuit for the converter shown in FIG. 1 according to respective embodiments of the present invention.
Figure 7:
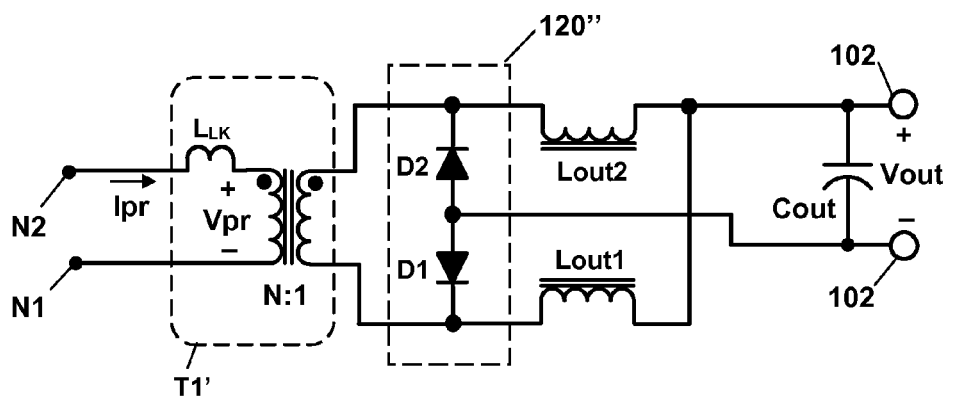

FIG. 4 shows an embodiment 110' of bridge circuit 110 where switches S1-S4 are implemented by insulated-gate field effect transistors (IGBTs). FIG. 5 shows an embodiment 110'' of bridge circuit 110 where switches S1-S4 are implemented by metal-oxide field-effect transistors (MOSFETs). (Capacitance and body diodes, either parasitic or discrete devices, are included for clarity.) Referring back to FIG. 1, while transformer T1 has been implemented with two secondary windings coupled to rectifying circuit 120, it may be appreciated that transformer T1 may be implemented with one secondary winding as a modified transformer T1' coupled to a rectifying circuit 120' having a full-wave bridge, as shown in FIG. 6. As another implementation, the modified transformer T1' may be coupled to a rectifying circuit 120'' having two diodes, and the rectifying circuit 120'' may be coupled to two output inductors Lout1 and Lout2, as shown in FIG. 7. While each of rectifying circuits 120, 120', and 120'' have been illustrated using diodes as the rectifying components, it may be appreciated that synchronous rectifiers (e.g., synchronously switched transistors) or combinations of synchronous rectifiers and diodes may be used in place of the diodes D1, D2, and DB shown in the figures. Accordingly, it should be understood that the term "current rectifying circuit" encompasses implementations that use diodes, synchronous rectifiers, other current rectifying devices, or combinations thereof.

Any recitation of "a", "an", and "the" is intended to mean one or more unless specifically indicated to the contrary.

The terms and expressions which have been employed herein are used as terms of description and not of limitation, and there is no intention in the use of such terms and expressions of excluding equivalents of the features shown and described, it being recognized that various modifications are possible within the scope of the invention claimed.

Moreover, one or more features of one or more embodiments of the inventions may be combined with one or more features of other embodiments of the invention without departing from the scope of the invention.

While the present inventions have been particularly described with respect to the illustrated embodiments, it will be appreciated that various alterations, modifications, adaptations, and equivalent arrangements may be made based on the present disclosure, and are intended to be within the scope of the invention and the appended claims.

What is claimed is:

1. A full-bridge power converter providing DC output power, the power converter comprising:
    an input port to receive a source of power to be converted;
    an output port to provide DC output power;
    a bridge circuit having a first switch and a second switch coupled in series at a first node, and a third switch and a fourth switch coupled in series at a second node, the series combination of the first and second switches being coupled in parallel with the input port, the series combination of the third and fourth switches being coupled in parallel with the input port;
    a transformer having a primary winding coupled to the first and second nodes, and at least one secondary winding;
    a current rectifying circuit coupled to the at least one secondary winding of the transformer; and
    an output inductor coupled between the rectifying circuit and the output port; and
    wherein each of the switches is switched between alternating conducting and non-conducting states a plurality of times, wherein the first and second switches are switched so that they are not in conducting states at the same time, wherein the third and fourth switches are switched so that they are not in conducting states at the same time, wherein the second and fourth switches are switched so that they are not in conducting states at the same time, and wherein the first and third switches are switched so they are in conducting states at the same time during a plurality of time durations.

2. The power converter of claim 1, wherein each of the first and third switches spends more time in its conducting state than in its non-conducting state.

3. The power converter of claim 1, wherein each of the second and fourth switches spends more time in its non-conducting state than in its conducting state.

4. The power converter of claim 1, wherein the bridge circuit comprises the following switching time sequence for the switches:
    the first switch is in a conducting state;
    thereafter, the third switch is in a non-conducting state;
    thereafter, the fourth switch is in a conducting state;
    thereafter, the fourth switch is in a non-conducting state;
    thereafter, the third switch is in a conducting state;
    thereafter, the first switch is in a non-conducting state;
    thereafter, the second switch is in a conducting state; and
    thereafter, the second switch is in a non-conducting state.

5. The power converter of claim 1, wherein current flowing in the output inductor is periodically reflected to the primary winding of the transformer and conducted by at least one of the first and third switches when the at least one switch is in a conducting state.

6. The power converter of claim 1, wherein the primary winding has a voltage that is asymmetrically shaped in time.

7. The power converter of claim 1, wherein the primary winding has a voltage that switches between a midpoint value and two extreme values on either side of the midpoint value, and wherein the switching time from the midpoint value to an extreme value is different from the switching time from the extreme value to the midpoint value.

8. The power converter of claim 1, further comprising an inductor coupled in series with the primary winding of the transformer at a third node, and located between the primary winding and one of the first and second nodes.

9. The power converter of claim 8, further comprising a rectifier coupled between the third node and the input port.

10. The power converter of claim 1, wherein the transformer comprises a first secondary winding coupled to the current rectifying circuit, and a second secondary winding coupled to the current rectifying circuit.

11. A full-bridge power converter providing DC output power, the power converter comprising:
    an input port to receive a source of power to be converted;
    an output port to provide DC output power;
    a bridge circuit comprising a first transistor, a second transistor, a third transistor, and a fourth transistor, each transistor having a first conduction terminal, a second conduction terminal, and a modulation terminal to receive a control signal having a first state that places the transistor in a conducting state where current can be conducted from its first conduction terminal to its second conduction terminal and a second state that places the transistor in a non-conducting state where current cannot be conducted from its first conduction terminal to its second conduction terminal, each of the first and second transistors having one of its conduction terminals coupled a first node and the other of its conduction terminals coupled to a respective terminal of the input port, each of the third and fourth transistors having one of its conduction terminals coupled a second node and the other of its conduction terminals coupled to a respective terminal of the input port;

a transformer having a primary winding coupled to the first and second nodes, and at least one secondary winding;

a current rectifying circuit coupled to the at least one secondary winding of the transformer; and an output inductor coupled between the rectifying circuit and the output port; and wherein each of the transistors is switched between alternating conducting and non-conducting states a plurality of times, wherein the first and second transistors are switched so that they are not in conducting states at the same time, wherein the third and fourth transistors are switched so that they are not in conducting states at the same time, wherein the second and fourth transistors are switched so that they are not in conducting states at the same time, and wherein the first and third transistors are switched so they are in conducting states at the same time during a plurality of time durations.

12. The power converter of claim 11, wherein the first and third transistors have conduction terminals coupled to the same terminal of the input port, and wherein the third and fourth transistors have conduction terminals coupled to the same terminal of the input port.

13. The power converter of claim 11, wherein each of the first and third transistors spends more time in its conducting state than in its non-conducting state.

14. The power converter of claim 11, wherein each of the second and fourth transistors spends more time in its non-conducting state than in its conducting state.

15. The power converter of claim 11, wherein the bridge circuit comprises the following switching time sequence for the transistors:

the first transistor is in a conducting state;
thereafter, the third transistor is in a non-conducting state;
thereafter, the fourth transistor is in a conducting state;
thereafter, the fourth transistor is in a non-conducting state;
thereafter, the third transistor is in a conducting state;
thereafter, the first transistor is in a non-conducting state;
thereafter, the second transistor is in a conducting state; and
thereafter, the second transistor is in a non-conducting state.

16. The power converter of claim 11, wherein current flowing in the output inductor is periodically reflected to the primary winding of the transformer and conducted by at least one of the first and third transistors when the at least one transistor is in a conducting state.

17. The power converter of claim 11, wherein the primary winding has a voltage that is asymmetrically shaped in time.

18. The power converter of claim 11, wherein the primary winding has a voltage that switches between a midpoint value and two extreme values on either side of the midpoint value, and wherein the switching time from the midpoint value to an extreme value is different from the switching time from the extreme value to the midpoint value.

19. The power converter of claim 11, further comprising an inductor coupled in series with the primary winding of the transformer at a third node, and located between the primary winding and one of the first and second nodes.

20. The power converter of claim 19, further comprising a rectifier coupled between the third node and the input port.

21. The power converter of claim 11, wherein the transformer comprises a first secondary winding coupled to the current rectifying circuit, and a second secondary winding coupled to the current rectifying circuit.

22. A method of operating a full-bridge power converter, the power converter having an input port to receive a source of power to be converted, an output port to provide DC output power, a bridge circuit having a first switch and a second switch coupled in series at a first node, and a third switch and a fourth switch coupled in series at a second node, the series combination of the first and second switches being coupled in parallel with the input port, the series combination of the third and fourth switches being coupled in parallel with the input port, a transformer having a primary winding coupled to the first and second nodes, and at least one secondary winding, a current rectifying circuit coupled to the at least one secondary winding of the transformer, and an output inductor coupled between the rectifying circuit and the output port, the method comprising:

placing the first switch in a conducting state;
thereafter placing the third switch in a non-conducting state;
thereafter placing the fourth switch in a conducting state;
thereafter placing the fourth switch in a non-conducting state;
thereafter placing the third switch in a conducting state;
thereafter placing the first switch in a non-conducting state;
thereafter placing the second switch in a conducting state; and
thereafter placing the second switch in a non-conducting state.

* * * * *